United States Patent
Daoud

[19]

[11] Patent Number: 5,944,209
[45] Date of Patent: Aug. 31, 1999

[54] DUAL USE COVER

[75] Inventor: Bassel Hage Daoud, Parsippany, N.J.

[73] Assignee: Lucent Technologies, Murray Hill, N.J.

[21] Appl. No.: 09/094,258

[22] Filed: Jun. 9, 1998

[51] Int. Cl.[6] .................................................. H02G 3/08
[52] U.S. Cl. ............................ 220/3.8; 220/832; 220/841; 220/379
[58] Field of Search ................................ 220/3.3, 3.8, 3.9, 220/4.02, 212, 831, 832, 840, 841, 379

[56] References Cited

U.S. PATENT DOCUMENTS

| 5,238,133 | 8/1993 | Cox | 220/3.8 |
| 5,391,837 | 2/1995 | Carey | 220/3.8 X |
| 5,430,248 | 7/1995 | Levy | 220/831 X |
| 5,533,642 | 7/1996 | Lafond et al. | 220/326 |
| 5,577,628 | 11/1996 | O'Neil et al. | 220/343 |
| 5,769,006 | 6/1998 | Allaer | 220/3.3 X |

*Primary Examiner*—Stephen K. Cronin
*Attorney, Agent, or Firm*—Claude R. Narcisse; I. Ionescu

[57] ABSTRACT

An outdoor assembly exposed to rain water has an enclosure and a cover. A first mounting means for the cover installs the cover to form a barrier to rain water for the enclosure rendering it drip proof or water proof. A second mounting means for the cover on the enclosure installs the cover to form a rain shield for the enclosure. The first mounting means allows opening or rotation of the cover about a vertical axis thus allowing access to the enclosure. The second mounting means releasingly engages the cover with respect to the enclosure generally at a right angle to the vertical direction, thus providing a rain shield for the enclosure.

19 Claims, 2 Drawing Sheets

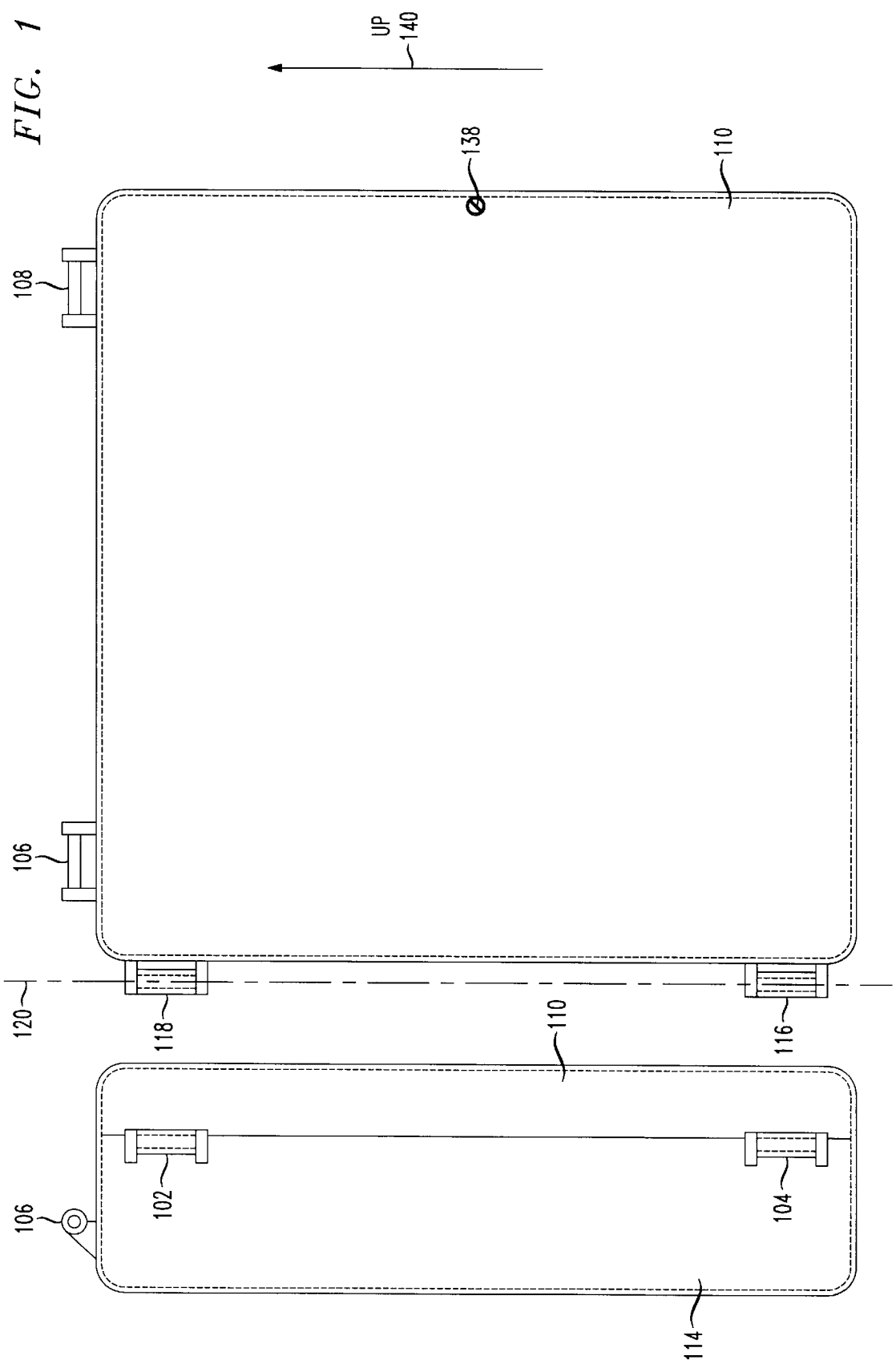

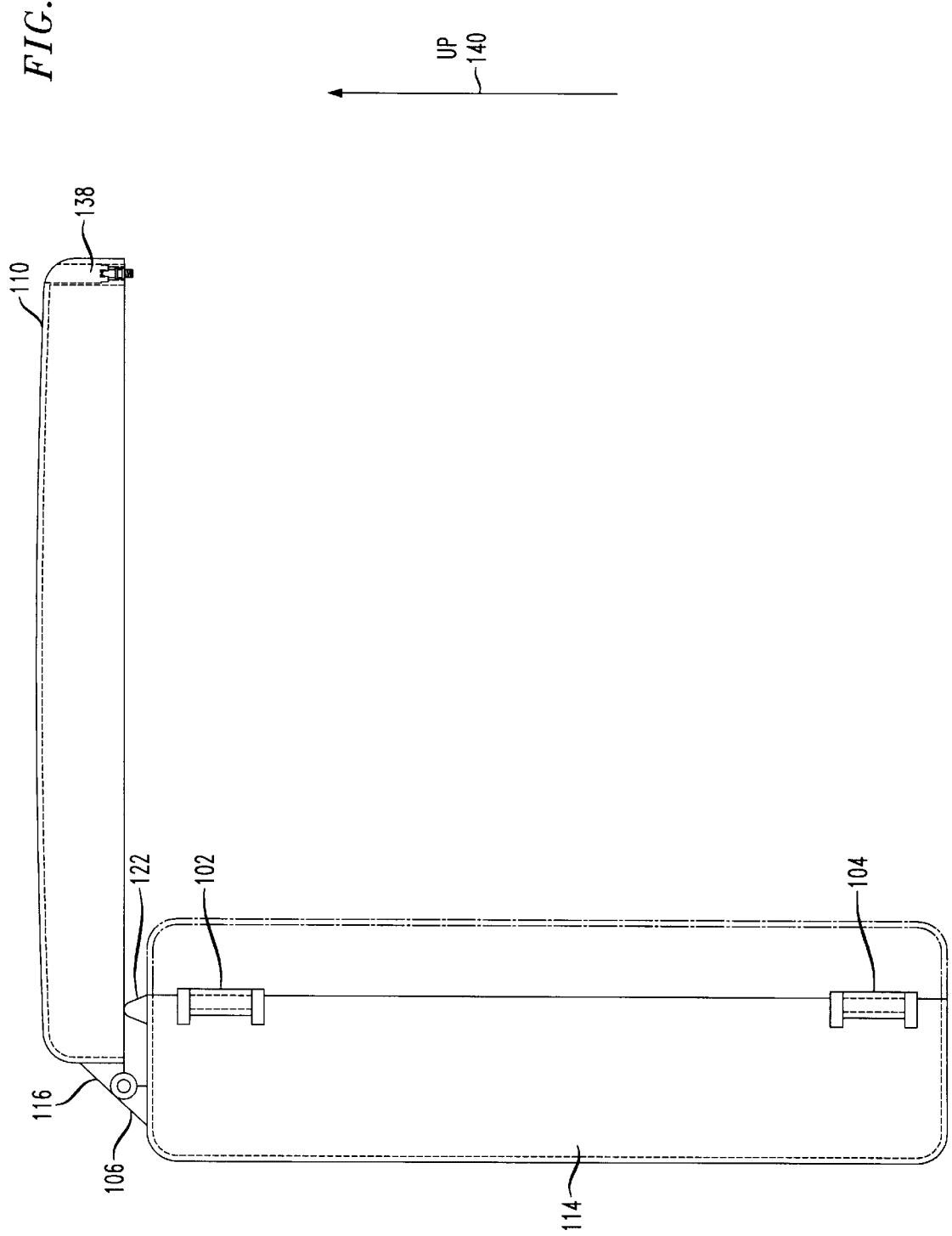

DUAL USE COVER

FIELD OF INVENTION

This invention is in the field of water resistant enclosures having covers for protecting the enclosure from rain water.

BACKGROUND OF THE INVENTION

Generally, outdoor electronic equipment susceptible to moisture damage is housed in enclosures with covers. These covers preclude rain water from entering the enclosure generally by either channeling the water away from the enclosure interior (drip proof) or by providing a waterproof seal between the cover and the enclosure. However, when a covers is removed from an enclosure, no further protection exists from rain water entering the enclosure. This lack of protection from rain water during the time the cover is removed exposes the sensitive equipment susceptible to moisture damage within the enclosure to rain water. Conversely, service of the equipment within the enclosure may have to be delayed during periods of rain thereby introducing delay in service to customers. Possible water damage and/or associated delay in servicing equipment are undesirable and costly.

SUMMARY OF INVENTION

Above problem is avoided in accordance with the present invention by providing an outdoor assembly exposed to rain water comprising an enclosure having a cover. A first mounting means for the cover is provided on the enclosure. This first mounting means installs the cover to form a barrier to rain water for the enclosure rendering it drip proof or water proof. A second mounting means is provided for the cover on the enclosure. The second mounting means installs the cover on the enclosure to form a rain shield for the enclosure. For example, the first mounting means allows opening or rotation of the cover about a vertical axis thus allowing access to the enclosure. In contrast, the second mounting means releasingly engages the cover in a fixed position with respect to the enclosure, generally at a right angle to the vertical direction.

BRIEF DESCRIPTION OF THE DRAWING

These and other features of the invention will become apparent from the following description and claims, when taken with the accompanying drawings, wherein similar reference characters refer to similar elements throughout, and in which:

FIG. 1 is an enclosure and cover of the present invention in a first position wherein the cover forms a barrier to rain water from entering the enclosure; and FIG. 2 is an enclosure and cover of the present invention wherein the cover is supported at a right angle to the enclosure and forms a rain shield for the enclosure.

DETAILED DESCRIPTION

As shown in FIG. 1, an outdoor assembly housing equipment susceptible to damage by rain water has an enclosure 114 and a cover 110. Hinges 102 and 104 on the enclosure 114 engage ears 118 and 116 respectively. When ear 118 is engaged into hinge 102 and ear 116 engages hinge 104, the cover 110 is installed so as to form a barrier to rain water from entering enclosure 114, thus rendering enclosure 114 drip proof. As another example, cover 110 has a sealing means, such as a gasket (not shown) between cover 110 and enclosure 114 to preclude rain water flow between cover 110 and enclosure 114 thus rendering the combination of enclosure 114 and cover 110 water proof. Direction 140 identifies the direction of earth's gravity with respect to a typical mounting for enclosure 114.

In a preferred embodiment of this invention, hinges 102 and 104 engage ears 116 and 118 so as to allow rotation of cover 110 around an axis 120, thus allowing access to the internal space within enclosure 114 while still supporting cover 110. Bolt 138 attaches cover 110 to enclosure 114.

As an example, axis 120, passing through the center of hinges 102 and 104, is chosen to be parallel to the vertical direction 140.

Also shown in FIG. 1, as another example, enclosure 114 has anchor 106 and anchor 108. Anchor 106 can releasably engage ear 116 on cover 110. Similarly, anchor 108 can engage ear 118 on cover 110. That is, ears 118 and 116 have the same spacing as anchors 106 and 108. Also, ears 118 and 116 have a crossection that is accepted by anchors 106 and 108. Thus when ears 118 and 116 are engaged into anchors 106 and 108, cover 110 is supported at a right angle to enclosure 114 thus providing a rain shield for enclosure 114.

As another exemplary embodiment, not shown, a set of hooks on cover 110, engage anchors 106 and 108 to support cover 110.

As shown in FIG. 2, cover 110 has engaged ear 116 into anchor 106, and ear 118 into anchor 108, thus supporting cover 110 to form a rain shield over enclosure 114. The rain shield thus formed from cover 110 protects moisture sensitive equipment within enclosure 114 from damage from rain water. The engagement position of cover 110 using hook 116 generally restrains cover 110 from rotating beyond a position forming an approximate right angle between cover 110 and enclosure 114. Dam 122 shown in FIG. 2 provides a stop for cover 110 to rest while hook 116 is engaged in anchor 106. Furthermore, dam 122 provides a barrier for rain water from flowing towards the inside surfaces of enclosure 114. Without dam 122, rain water may flow into enclosure 114, depending on the mounting angle of enclosure 114 with the vertical, as described by direction 140.

As another example of an embodiment, the following procedure is used with this invention to provide protected access to the interior of an outdoor enclosure exposed to rain water.

A. For long term outdoor installation, engage cover 110 into enclosure 114 using ears 118 and 116 mated to hinges 102 and 104. This will install cover 110 to form a permanent, drip proof barrier to rain water for enclosure 114.

B. When access to enclosure 114 is desired, especially during a period of light rain, or just to store cover 110, disengage cover 110 from hinges 102 and 104, and re-install cover 110 engaging, for example, hooks 106 and 108. Thus cover 110 forms a rain shield for enclosure 114, as it is installed at a right angle to enclosure 114.

It is understood that other anchors, similar to the one shown, may be engaged by ears, similar to ear 116.

Although presented in exemplary fashion employing specific embodiments, the disclosed structures are not intended to be so limited. Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

I claim:

1. An outdoor enclosure, formed from at least one vertical surface oriented in a generally vertical direction, and at least one horizontal surface oriented in a generally horizontal direction, for housing equipment susceptible to damage from rain water comprising:

a first mounting means for a cover, said first mounting means located on said vertical surface of said enclosure,
said first mounting means detachably installing said cover vertically to form a barrier to said rain water from entering said enclosure;

a second mounting means for said cover,
said second mounting means located on said horizontal surface of said enclosure,
said second mounting means installing said cover horizontally to form a rain shield for said enclosure.

2. An enclosure as claimed in claim 1, wherein said first mounting means allows detachable rotation of said cover about an axis thus allowing access to said enclosure.

3. An enclosure as claimed in claim 2, wherein said axis is in a vertical direction.

4. An enclosure as claimed in claim 1, wherein said second mounting means restrains detachably said cover in a fixed horizontal position with respect to said enclosure.

5. An enclosure as claimed in claim 4, wherein said fixed position is at a right angle with respect to a vertical direction.

6. A cover for covering an enclosure housing equipment susceptible to damage from rain water, said enclosure formed from at least one vertical surface oriented in a generally vertical direction, and at least one horizontal surface oriented in a generally horizontal direction, said cover comprising:

a mounting means wherein said mounting means detachably engages a hinge on said enclosure for installing said cover in a vertical position, said vertical position installing said cover to form a barrier to rain water from entering said enclosure and wherein said mounting means detachably engages a restraint on said enclosure in a horizontal position for said cover to form a rain shield for said enclosure.

7. A cover as claimed in claim 6, wherein said hinge allows detachable engagement for rotation of said cover about an axis.

8. A cover as claimed in claim 7, wherein said axis is in a vertical direction.

9. A cover as claimed in claim 6, wherein said second mounting means restrains said cover in a fixed horizontal position with respect to said enclosure.

10. A cover as claimed in claim 9, wherein said fixed position is at a right angle with respect to a vertical direction.

11. An outdoor assembly housing equipment susceptible to damage by rain water comprising:

an enclosure formed from at least one vertical surface oriented in a generally vertical direction, and at least one horizontal surface oriented in a generally horizontal direction;

a cover having engagement means;

a first mounting means mounted on said vertical surface for engaging said engagement means of said cover on said enclosure, said first mounting means detachably installing said cover vertically to form a barrier to said rain water from entering said enclosure; and a second mounting means mounted on said horizontal surface for engaging said engagement means of said cover on said enclosure, said second mounting means detachably installing said cover horizontally to form a rain shield for said enclosure thus protecting said equipment from damage from said rain water.

12. An assembly as claimed in claim 11, wherein said first mounting means allows detachment from and rotation of said cover about an axis.

13. An assembly as claimed in claim 12, wherein said axis is in said vertical direction.

14. An assembly as claimed in claim 11, wherein said second mounting means detachably engages said cover in a fixed horizontal position with respect to said enclosure.

15. An enclosure as claimed in claim 14, wherein said fixed position of said cover is at a right angle with respect to said vertical direction.

16. A method for providing protection for an outdoor enclosure exposed to rain water comprising the steps of:

vertically engaging a cover for said enclosure in a first mounting means for said cover, said first mounting means detachably installing said cover to form a drip proof barrier to said rain water for said enclosure;

horizontally engaging said cover in a second mounting means for said cover, said second mounting means detachably installing said cover to form a rain shield for said enclosure.

17. A method as claimed in claim 16, wherein the step of vertically engaging of said first mounting means by said cover allows rotation of said cover about an axis.

18. A method as claimed in claim 16, wherein said the step of engaging said second mounting means installs said cover in a fixed position with respect to said enclosure.

19. A method as claimed in claim 18, wherein said fixed position arrived at during said horizontally engaging step by said second mounting means upon said cover is at a right angle with respect to a vertical direction.

* * * * *